United States Patent [19]

Baumgart et al.

[11] Patent Number: 5,287,238
[45] Date of Patent: Feb. 15, 1994

[54] DUAL SPIN VALVE MAGNETORESISTIVE SENSOR

[75] Inventors: Peter M. Baumgart, San Jose, Calif.; Bernard Dieny, Grenoble Credex, France; Bruce A. Gurney, Santa Clara, Calif.; Jean-Pierre Nozieres, Corenc, France; Virgil S. Speriosu, San Jose; Dennis R. Wilhoit, Morgan Hill, both of Calif.

[73] Assignee: International Business Machines Corporation, Armonk, N.Y.

[21] Appl. No.: 973,106

[22] Filed: Nov. 6, 1992

[51] Int. Cl.$^5$ .................................................. G11B 5/39
[52] U.S. Cl. .................................. 360/113; 338/32 R; 324/207.21; 324/252
[58] Field of Search ..................... 360/113; 338/32 R; 324/207.21, 252

[56] References Cited

U.S. PATENT DOCUMENTS

| | | | |
|---|---|---|---|
| 4,949,039 | 8/1990 | Grunberg | 324/252 |
| 5,134,533 | 7/1992 | Friedrich et al. | 360/113 |
| 5,159,513 | 10/1992 | Dieny et al. | 360/113 |
| 5,206,590 | 4/1993 | Dieny et al. | 324/252 |
| 5,243,316 | 9/1993 | Sakakima et al. | 338/32 R |
| 5,251,088 | 10/1993 | Coutellier et al. | 360/113 |

OTHER PUBLICATIONS

"Giant MR: A Primer", White, IEEE Trans. on Magnetics, vol. 28, No. 5, Sep. 1992 pp. 2482-2486.
Thompson, "Thin Film Magnetoresistors in Memory, Storage, and Related Applications", Jul. 1975, TEEE Transactions On Magnetics Mag.-11, No. 4, pp. 1039-1050.

Primary Examiner—Robert S. Tupper
Attorney, Agent, or Firm—Leslie G. Murray

[57] ABSTRACT

A magnetoresistive read sensor based on the spin valve effect and having a multilayered, dual spin valve structure is described. The sensor read element includes first, second and third layers of ferromagnetic material separated from each other by layers of non-magnetic metallic material. The first and third layers of ferromagnetic material, i.e., the outer layers of the structure, have their magnetization orientation fixed, while the second, intermediate ferromagnetic layer is magnetically soft and has its magnetization oriented perpendicular to that of both the outer ferromagnetic layers in the absence of an applied magnetic field. In one preferred embodiment, the two outer ferromagnetic layers have their magnetizations fixed parallel to each other by exchange coupling with adjacent antiferromagnetic layers.

36 Claims, 7 Drawing Sheets (a) Low R (b) High R (b) High R (a) Low R

DUAL SPIN VALVE MAGNETORESISTIVE SENSOR

BACKGROUND OF THE INVENTION

The present invention relates generally to magnetic sensors for reading information signals recorded in a magnetic medium and, more particularly, to an improved magnetoresistive read sensor which utilizes a multilayered, dual spin valve structure and antiferromagnetic exchange coupling to provide a fixed bias field for the sensor.

The prior art discloses a magnetic read transducer referred to as a magnetoresistive (MR) sensor or head which has been shown to be capable of reading data from a magnetic surface at great linear densities. An MR sensor detects magnetic field signals through the resistance changes of a read element fabricated of a magnetic material as a function of the strength and direction of magnetic flux being sensed by the read element. These prior art MR sensors operate on the basis of the anisotropic magnetoresistive (AMR) effect in which a component of the read element resistance varies as the square of the cosine ($cos^2$) of the angle between the magnetization and the direction of sense current flow through the element. A more detailed description of the AMR effect can be found in "Memory, Storage, and Related Applications", D. A. Thompson et al., IEEE Trans. Mag. MAG-11, p. 1039 (1975).

More recently, a different, more pronounced magnetoresistive effect has been described in which the change in resistance of a layered magnetic sensor is attributed to the spin-dependent transmission of the conduction electrons between the magnetic layers through a non-magnetic layer and the accompanying spin-dependent scattering at the layer interfaces. This magnetoresistive effect is variously referred to as the "giant magnetoresistive" or "spin valve" effect. Such a magnetoresistive sensor fabricated of the appropriate materials provides improved sensitivity and greater change in resistance than observed in sensors utilizing the AMR effect. In this type of MR sensor, the in-plane resistance between a pair of ferromagnetic layers separated by a non-magnetic layer varies as the cosine ($cos$) of the angle between the magnetization in the two layers.

U.S. Pat. No. 4,949,039 to Grunberg describes a layered magnetic structure which yields enhanced MR effects caused by antiparallel alignment of the magnetizations in the magnetic layers. As possible materials for use in the layered structure, Grünberg lists ferromagnetic transition metals and alloys, but does not indicate preferred materials from the list for superior MR signal amplitude. Grunberg further describes the use of antiferromagnetic-type exchange coupling to obtain the antiparallel alignment in which adjacent layers of ferromagnetic materials are separated by a thin interlayer of chromium (Cr) or yttrium (Y).

U.S. Pat. No. 5,206,590, assigned to the instant assignee, discloses an MR sensor in which the resistance between two uncoupled ferromagnetic layers is observed to vary as the cosine of the angle between the magnetizations of the two layers and which is independent of the direction of current flow through the sensor. This mechanism produces a magnetoresistance that, for selected combinations of materials, is greater in magnitude than the AMR, and is referred to as giant magnetoresistance or the "spin valve" (SV) magnetoresistance.

Co-pending U.S. patent application Ser. No. 07/937,620 filed Aug. 28, 1992, assigned to the instant assignee, discloses an MR sensor based on the above-described effect which includes two thin film layers of ferromagnetic material separated by a thin film layer of a non-magnetic metallic material and in which the magnetization of one ferromagnetic layer is maintained perpendicular to the magnetization of the other ferromagnetic layer at zero externally applied magnetic field by exchange coupling with an adjacent layer of antiferromagnetic material.

SUMMARY OF THE INVENTION

In accordance with the principles of the present invention, a magnetoresistive (MR) read sensor having a multilayered, dual spin valve structure provides a large MR response at low applied magnetic fields. The MR structure comprises a layered structure formed on a suitable substrate including first, second and third thin film layers of ferromagnetic material separated by thin film layers of non-magnetic metallic material. The first and third layers of ferromagnetic material, i.e., the outer layers of the structure, have their magnetization orientation fixed while the second, intermediate layer of ferromagnetic material is magnetically soft and has its magnetization oriented substantially perpendicular to that of both the outer layers of ferromagnetic material. The magnetization directions of the first and third layers of ferromagnetic material can be fixed or "pinned" by any of several methods including hard biasing or exchange biasing by an adjacent antiferromagnetic layer as is known in the art.

In a preferred embodiment, the two outer ferromagnetic layers have their magnetization directions pinned antiparallel to each other and, thus, each pinned layer acts as a magnetic flux keeper for the other pinned layer. The magnetization direction of the second, intermediate ferromagnetic layer is free to rotate with an applied magnetic field. The electrical resistance of each pair of ferromagnetic layers, i.e., the first and second layers and the second and third layers, varies as a function of the cosine of the angle between the magnetization directions of the two ferromagnetic layers of the pair. For a proper choice of materials, including consideration of the material resistivity as a function of the conduction electron spin, the effect is additive between the two pairs of layers and an MR sensor can be fabricated in which the resistance of the sensor varies from a minimum to a maximum value when the magnetization direction of the intermediate, free layer rotates from a direction near parallel to the magnetization of the first, outer pinned layer, for example, to a direction near parallel to the magnetization direction of the third, outer pinned layer. A current source provides a sense current to the MR sensor which generates a voltage drop across the read element proportional to the variations in the resistance of the MR sensor due to the rotation of the magnetization in the intermediate, free layer of ferromagnetic material as a function of the applied external magnetic field being sensed.

In a second preferred embodiment of the present invention, a multilayered, dual spin valve sensor is provided in which the magnetization directions in the two outer ferromagnetic layers are parallel with both being perpendicular to the direction of magnetization in the center, free ferromagnetic layer.

BRIEF DESCRIPTION OF THE DRAWINGS

The foregoing and other objects, features and advantages of the present invention will be apparent from the following detailed description of the preferred embodiments of the invention, reference being made to the accompanying drawings, in which like reference numerals indicate like parts and in which.

DETAILED DESCRIPTION OF THE PREFERRED EMBODIMENTS

Figure 1:
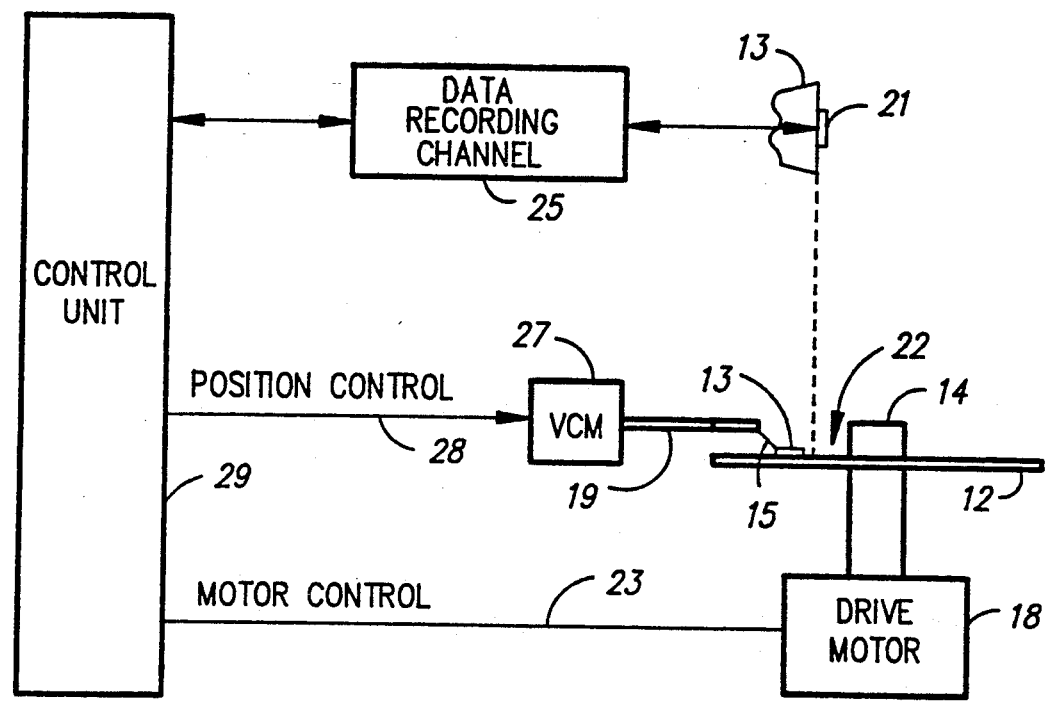
FIG. 1 is a simplified block diagram of a magnetic disk storage system embodying the present invention.

Referring now to FIG. 1, although the invention is described as embodied in a magnetic disk storage system as shown in FIG. 1, it will be apparent that the invention is also applicable to other magnetic recording systems such as a magnetic tape recording system, for example. At least one rotatable magnetic disk 12 is supported on a spindle 14 and rotated by a disk drive motor 18. The magnetic recording media on each disk is in the form of an annular pattern of concentric data tracks (not shown) on disk 12.

At least one slider 13 is positioned on the disk 12, each slider 13 supporting one or more magnetic read-/write transducers 21, typically referred to as read/write heads. As the disks rotate, the sliders 13 are moved radially in and out over the disk surface 22 so that the heads 21 may access different portions of the disk where desired data is recorded. Each slider 13 is attached to an actuator arm 19 by means of a suspension 15. The suspension 15 provides a slight spring force which biases the slider 13 against the disk surface 22. Each actuator arm 19 is attached to an actuator means 27. The actuator means as shown in FIG. 1 may be a voice coil motor (VCM), for example. The VCM comprises a coil moveable within a fixed magnetic field, the direction and velocity of the coil movements being controlled by the motor current signals supplied by a controller.

During operation of the disk storage system, the rotation of the disk 12 generates an air bearing between the slider 13 and the disk surface 22 which exerts an upward force or lift on the slider. The air bearing thus counterbalances the slight spring force of the suspension 15 and supports the slider 13 off and slightly above the disk surface by a small, substantially constant spacing during operation.

The various components of the disk storage system are controlled in operation by control signals generated by control unit 29, such as access control signals and internal clock signals. Typically, the control unit 29 comprises logic control circuits, storage means and a microprocessor, for example. The control unit 29 generates control signals to control various system operations such as drive motor control signals on line 23 and head position and seek control signals on line 28. The control signals on line 28 provide the desired current profiles to optimally move and position a selected slider 13 to the desired data track on the associated disk 12. Read and write signals are communicated to and from read/write heads 21 by means of recording channel 25.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
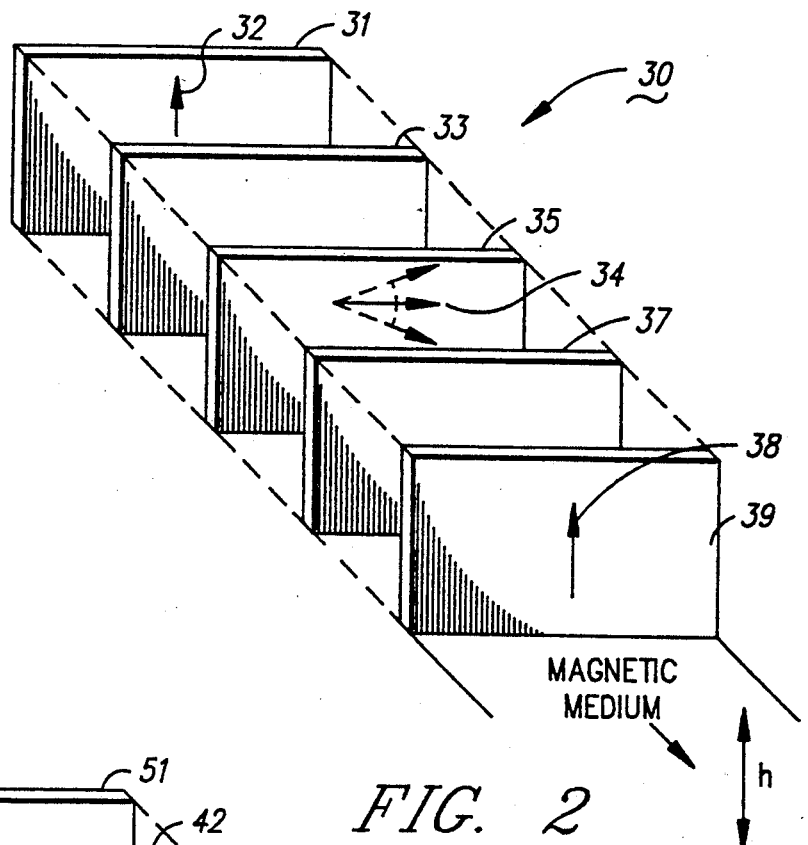
FIG. 2 is an exploded view in perspective of a preferred embodiment of the magnetoresistive sensor according to the principles of the present invention.

Referring now to FIG. 2, a preferred embodiment of an MR sensor 30 according to the principles of the present invention comprises a first thin film layer 31 of ferromagnetic material, a first thin film layer 33 of a non-magnetic metallic material, a second thin film layer of ferromagnetic material 35, a second thin film layer 37 of a non-magnetic metallic material and a third thin film layer 39 of ferromagnetic material. The magnetizations of the two outer layers 31 and 39 of ferromagnetic material are oriented parallel to each other, i.e., in the same direction, and at an angle of about 90 degrees with respect to the magnetization of the intermediate layer 35 of ferromagnetic material in the absence of an externally applied magnetic field as indicated by arrows 32, 34 and 38, respectively. In addition, the magnetization directions of the first and third outer layers, 31 and 39 of ferromagnetic material are fixed or pinned in a preferred orientation as shown by the arrows 32 and 38. Thus, while the magnetization directions of the outer ferromagnetic layers 31, 39 remain fixed, the magnetization in the intermediate layer 35 of ferromagnetic material is free to rotate its direction in response to an externally applied magnetic field (such as magnetic field h as shown in FIG. 2), as shown by the dashed arrows 34 on layer 35 in FIG. 2.

Figure 9:
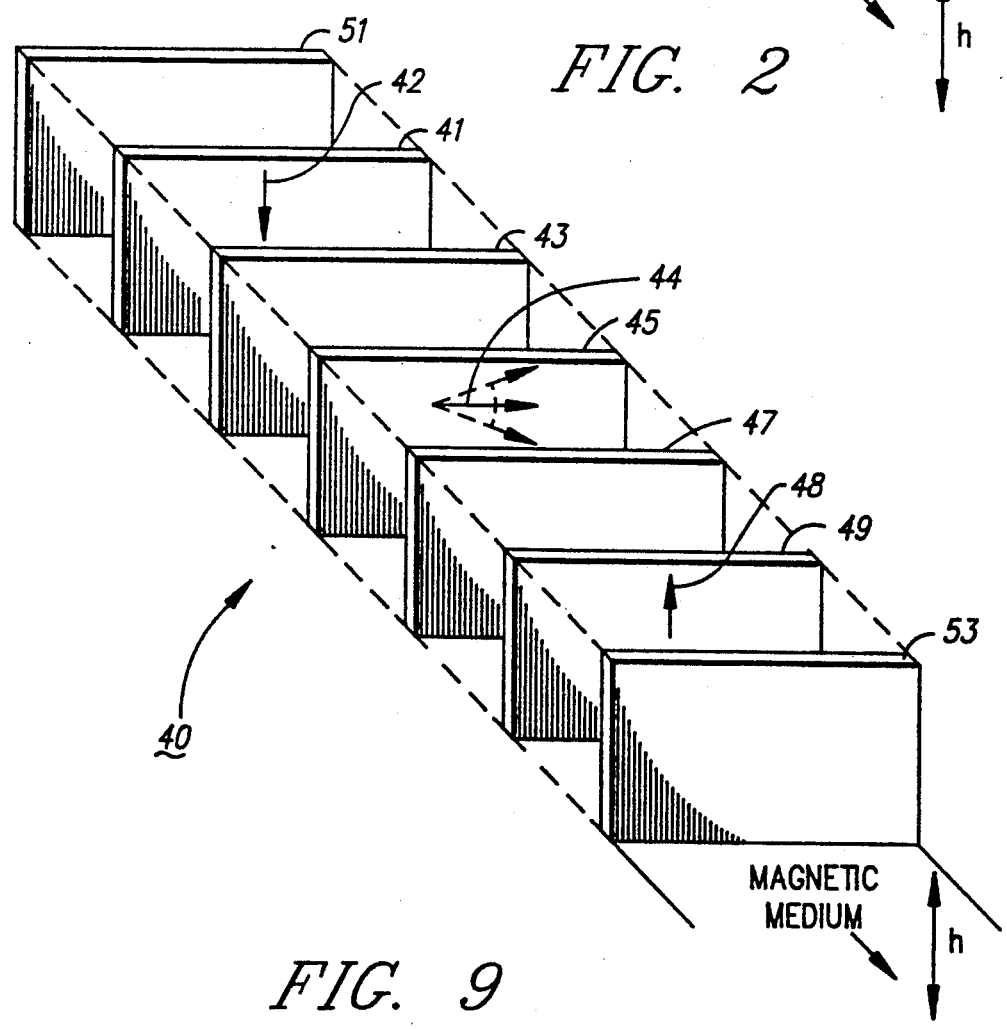
FIG. 9 is an exploded view in perspective of another preferred embodiment of the magnetoresistive sensor according to the principles of the present invention.

According to this preferred embodiment of the present invention, the ferromagnetic layers 31, 35 and 39 can be fabricated of any suitable magnetic material such as cobalt (Co), iron (Fe), nickel (Ni) and their alloys such as nickel-iron (NiFe), nickel-cobalt (NiCo) and iron-cobalt (FeCo), for example. The non-magnetic metallic spacer layers 33 and 37 comprise copper (Cu), for example, or other suitable noble metal such as silver (Ag) or gold (Au) or their alloys. An MR sensor based on the spin valve effect wherein the sensor read elements comprises a ferromagnetic/non-magnetic/ferromagnetic layered structure is described in greater detail in the above referenced patent no. 5,206,590 hereby incorporated by reference as if fully set forth herein. The fixed or pinned outer ferromagnetic layers 31 and 39 can be exchange biased by adjacent layers (as shown in FIG. 9) of an antiferromagnetic material such as iron-manganese (FeMn), for example. An MR sensor based on the spin valve effect wherein a pinned ferromagnetic layer is exchanged biased by an adjacent antiferromagnetic layer is described in greater detail in the above referenced patent application Ser. No. 07/937,620 hereby incorporated by reference as if fully set forth herein. Alternatively, the magnetization directions of the pinned ferromagnetic layers 31, 39 can be fixed by use of an adjacent hard magnetic layer or by use of a material having a sufficiently high coercivity for the outer pinned layers 31, 39.

The structure of a conventional or single spin valve MR sensor as described in the above-cited patent applications is essentially $FM_{free}/NM/FM_{pinned}/AFM$ where $FM_{free}$ and $FM_{pinned}$ are ferromagnetic layers separated by a non-magnetic layer NM. The orientation of the magnetization of the $FM_{pinned}$ layer is fixed up to some moderate magnetic field by the exchange coupled bias field provided by the antiferromagnetic layer AFM. The magnetoresistive effect of the sensor is based on the fact that, when the directions of the magnetization in the adjacent FM layers are different, conduction electrons traversing the NM layer from one FM layer to the other are scattered depending on their spins such that the resistance of the sensor increases. This change in resistance is a function of the cosine of the angle between the directions of the magnetizations in the FM layers and is minimum when the magnetizations are parallel, i.e., in the same direction, and maximum when the magnetizations in the layers antiparallel, i.e., in opposite directions.

However, it is observed that in the single spin valve structure described above conduction electrons are scattered out of the free FM layer not only towards the pinned FM layer, but in the opposite direction, away from the pinned FM layer as well. Thus, only that portion of the conduction electrons scattered between the two FM layers contribute to the magnetoresistive effect for the sensor.

The structure described above with reference to FIG. 2 comprises a "dual" spin valve wherein the spin valve structure is doubled symmetrically with respect to the $FM_{free}$ layer. The structure of a dual spin valve is $AFM_1/FM_{p1}/NM_1/FM_{free}/NM_2/FM_{p2}/AFM_2$ providing two pairs of FM layers separated by a NM layer which allows utilization of the conduction electrons scattered in both directions from the intermediate $FM_{free}$ layer. The directions of magnetization in the two pinned outer layers, $FM_{p1}$ and $FM_{p2}$ are fixed by adjacent antiferromagnetic layers $AFM_1$ and $AFM_2$, respectively, while the direction of magnetization in the $FM_{free}$ layer is allowed to rotate freely in response to an applied magnetic field.

Figure 3:
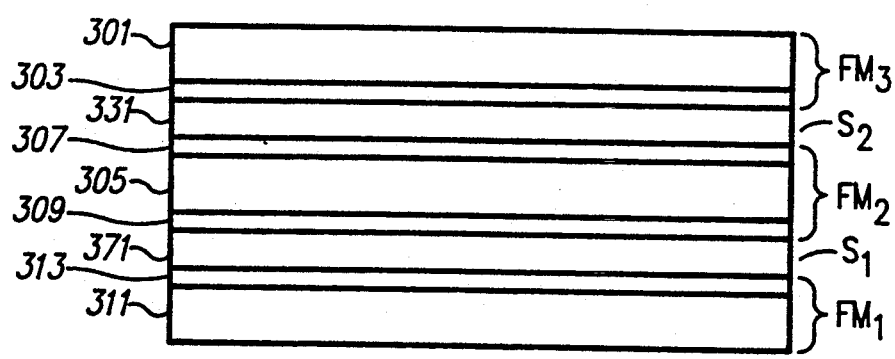
FIG. 3 is an end view of another preferred embodiment of the magnetoresistive sensor according to the principles of the present invention.
Figure 10:
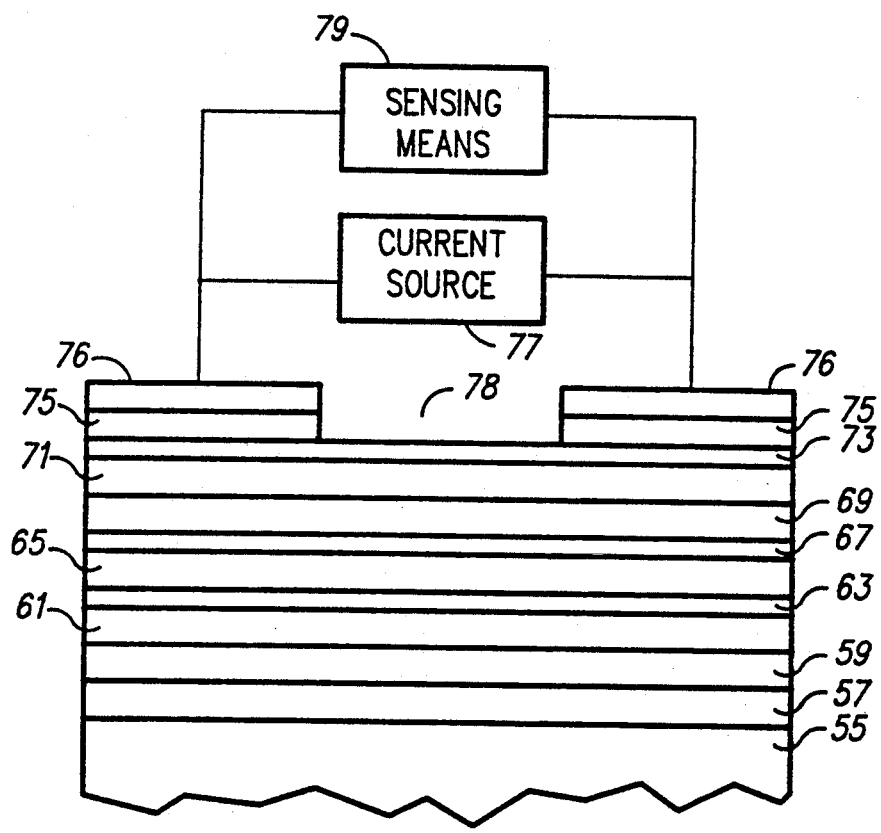
FIG. 10 is an end view of another embodiment of a magnetoresistive sensor constructed in accordance with the present invention.

Referring now also to FIG. 3, an end view of a dual spin valve sensor as described with reference to FIGS. 2, 9 and 10 is shown wherein each of the ferromagnetic layers $FM_1$, $FM_2$ and $FM_3$ comprise multiple layers of ferromagnetic materials. As described above, a dual spin valve sensor comprises the structure $FM_1/S_1/FM_2/S_2/FM_3$ as shown. In this embodiment, the first ferromagnetic layer $FM_1$ comprises a layer of a first ferromagnetic material 311, such as NiFe, for example, and a thin layer 313, referred to as a "nanolayer", of a second ferromagnetic material, such as Co, for example. The nanolayer 313 of the second ferromagnetic material is deposited at the interface between the first ferromagnetic layer and the first spacer layer 371. Thus, the first ferromagnetic layer forms a bilayer 311, 313 of two different ferromagnetic materials. Similarly, the third ferromagnetic layer $FM_3$ comprises a bilayer 301, 303 of two different ferromagnetic materials with the nanolayer 303 formed at the interface between the third ferromagnetic layer $FM_3$ and the second spacer layer 331. Since the second, central ferromagnetic layer $FM_2$ forms an interface with both spacer layers 331 and 371, the second ferromagnetic layer $FM_2$ will comprise a trilayer having a center layer 305 of ferromagnetic material, such as NiFe, for example, with a nanolayer 309, 307 of a second ferromagnetic material, such as Co, for example, formed at the interface with each of the adjacent spacer layers 371, 331, respectively. The thickness of the nanolayers is in the range of 0.5 to 20 Å. Alternatively, the nanolayer can be formed within the ferromagnetic layer at a distance X from the interface between the ferromagnetic layer and the spacer layer. In the case where the nanolayer is formed within the ferromagnetic layer, the material utilized for the nanolayer can be a non-magnetic material, such as Cr, for example, as well as a ferromagnetic material. Magnetoresistive sensors employing nanolayers as described above are described in greater detail in commonly assigned co-pending U.S. patent application Ser. No. 07/750,157 filed Aug. 26, 1991, hereby incorporated by reference as if fully set forth herein.

Figure 4:
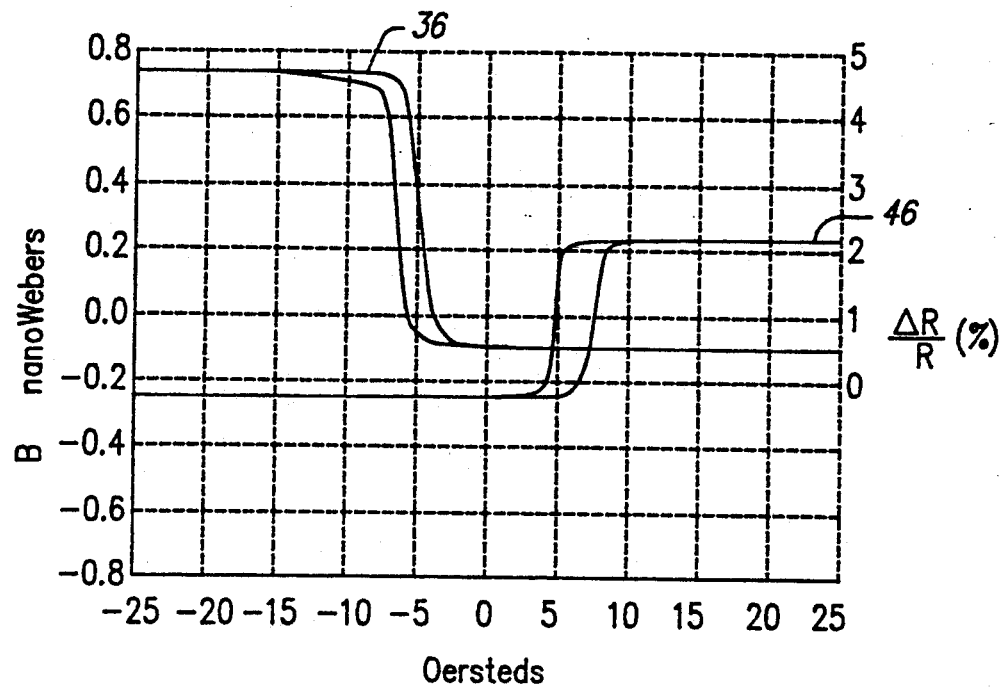
FIG. 4 is a is a graph illustrating the hysteresis loop and the magnetoresistive response for a prior art spin valve MR sensor structure.
Figure 5:
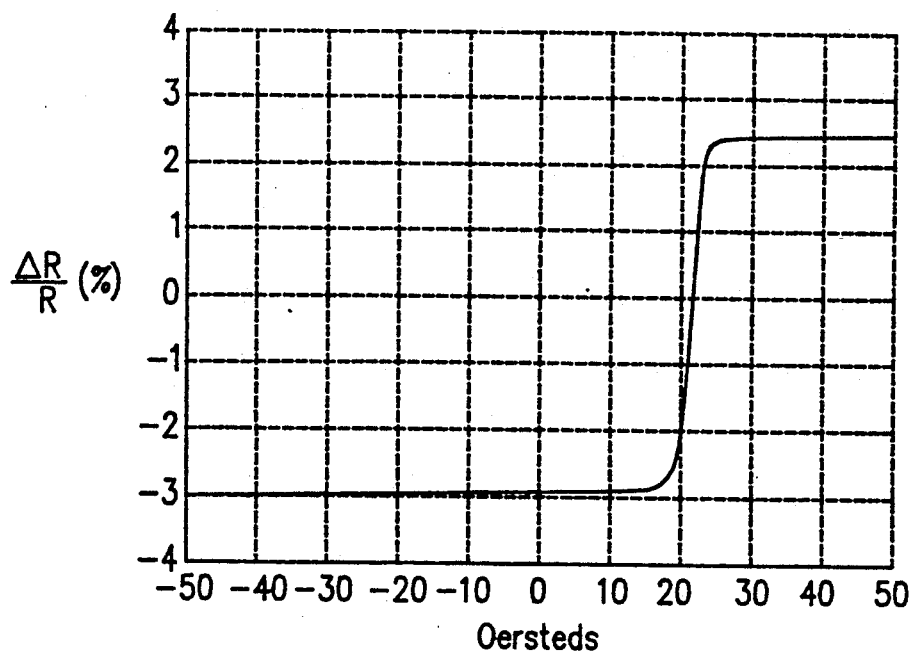
FIG. 5 is a graph illustrating the magnetoresistive response for the MR sensor shown in FIG. 2.

Referring now also to FIGS. 4 and 5, the magnetoresistance, curve 36, and the hysteresis loop, curve 46, for a conventional, single spin valve MR sensor and the magnetoresistance characteristic for a dual spin valve MR sensor according to the present invention, respectively, are illustrated for comparison purposes. As shown in FIG. 4, a spin valve sensor of the type described in co-pending patent application Ser. No. 07/937,620, cited above, deposited on a silicon (Si) substrate and having the structure, Si/50Ta/7-5NiFe/22.5Cu/50NiFe/110FeMn/50Ta wherein the numbers indicate the layer thickness in Å and the two tantalum (Ta) layers serve as a buffer layer and a capping layer, respectively, provides a maximum magnetoresistance, (delta R)/R, of 4 percent. The thickness of the layers is optimized to provide the highest value of magnetoresistance obtainable for these materials in this structure.

In contrast, as shown in FIG. 5, a preferred embodiment of the dual spin valve formed on a Si substrate having the structure, Si/50Ta/20NiFe/110FeMn/60NiFe/25Cu/100NiFe/25Cu/60NiFe/110FeMn/50Ta provides a magnetoresistance of 5.5 percent, a 35 percent increase over that obtained from the single spin valve structure. The first NiFe layer in the above dual spin valve structure provides a seed layer utilized to obtain the necessary crystalline structure to provide antiferromagnetic FeMn; any material having sufficiently high resistivity to minimize current shunting and which permits the growth of an antiferromagnetic form of FeMn is suitable for use as the seed layer.

Figure 6:
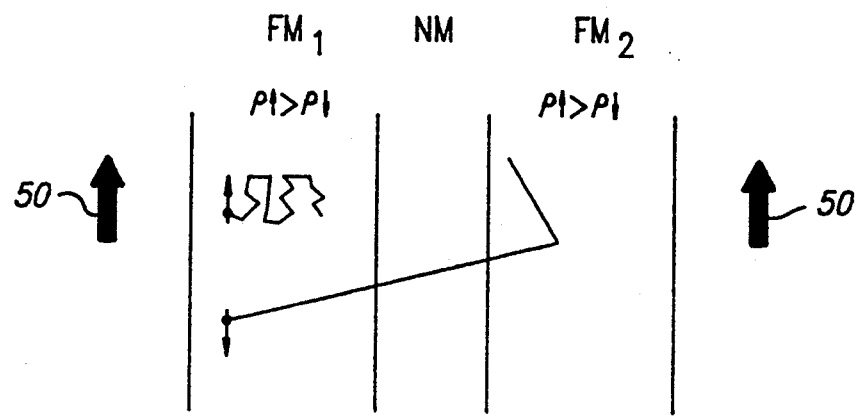
FIGS. 6(a) and 6(b) are schematic diagrams illustrating a spin valve structure having positive giant magnetoresistance.
Figure 6:
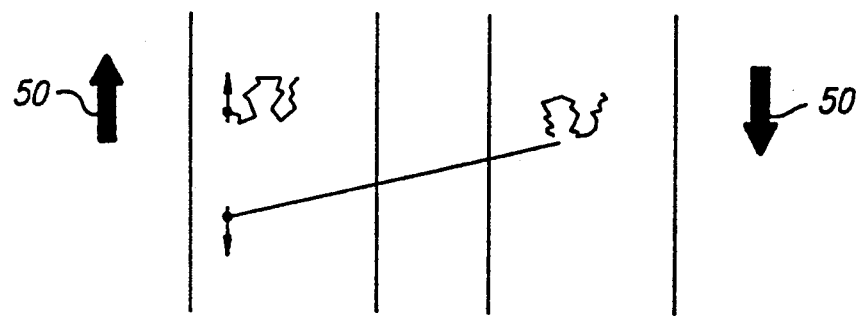
Figure 7:
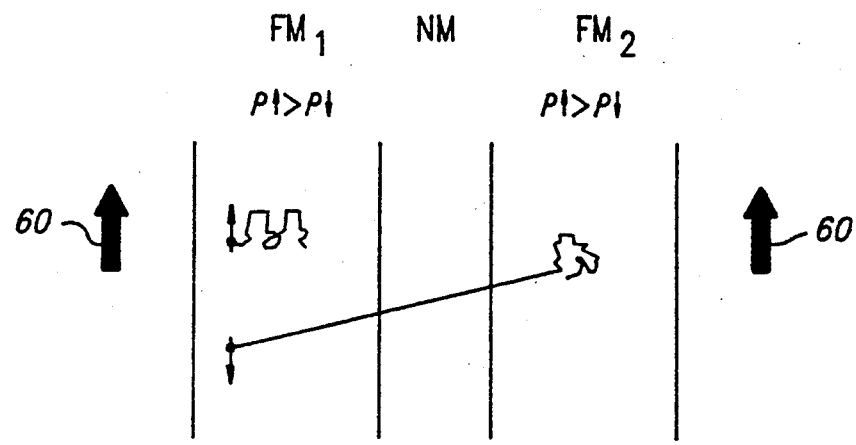
FIGS. 7(a) and 7(b) are schematic diagrams illustrating a spin valve structure having negative giant magnetoresistance.
Figure 7:
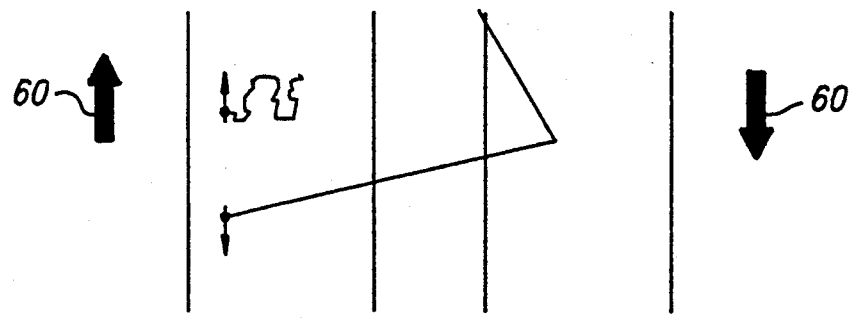
Figure 8:
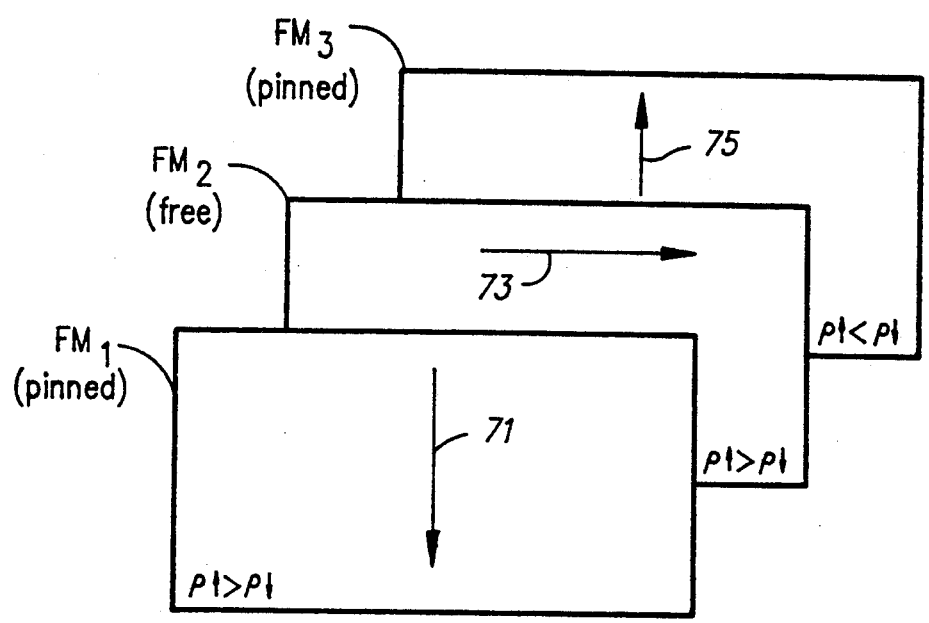
FIG. 8 is a schematic diagram of a dual spin valve utilizing positive and negative giant magnetoresistance according to the principles of the present invention.

Referring now to FIGS. 6, 7 and 8, a dual spin valve MR sensor can be designed wherein the directions of the magnetizations in the outer, pinned ferromagnetic layers are maintained antiparallel to each other, i.e., in opposite directions. Further, by proper choice of materials for the different layers, both positive and negative spin-dependent magnetoresistance, referred to as giant magnetoresistance (GMR), can be utilized to produce a high value of (delta R)/R for the sensor. As shown in FIG. 6, a single spin valve structure having positive GMR comprises two ferromagnetic layers, $FM_1$ and $FM_2$, separated by a nonmagnetic layer, NM, wherein for both ferromagnetic layers the resistivities for spin-up ($rho_{up}$) and spin-down ($rho_{down}$) satisfy either the relation $rho_{up} > rho_{down}$ or the relation $rho_{up} < rho_{down}$. For this structure, the resistance is minimum when the magnetizations, as indicated by arrows 50, of the layers $FM_1$ and $FM_2$ are parallel and maximum when the magnetizations of the layers $FM_1$ and $FM_2$ are antiparallel. As shown in FIG. 7, a single spin valve structure having negative GMR comprises two ferromagnetic layers separated by a nonmagnetic layer wherein for the first ferromagnetic layer, $FM_1$, $rho_{up} > rho_{down}$ and for the second ferromagnetic layer, $FM_2$, $rho_{up} < rho_{down}$. For this structure, the resistance is minimum for antiparallel alignment of the magnetizations, as indicated by arrows 60, and maximum for parallel alignment of the magnetizations.

For example, FIG. 8 illustrates three ferromagnetic layers according to the present invention. Between layers $FM_1$ and $FM_2$ the GMR is positive producing minimum resistance for parallel alignment of their magnetizations, arrows 71 and 73, respectively. On the other hand, between layers $FM_2$ and $FM_3$ the GMR is positive so that minimum resistance is produced for antiparallel alignment of their magnetizations, arrows 73 and 75, respectively. Since the magnetizations of layers $FM_1$ and $FM_3$ are pinned in opposite directions, arrows 71 and 75, the net effect for the structure is that the resistance is maximum when the magnetization of the free layer $FM_2$, arrow 73, is aligned parallel with the magnetization of pinned layer $FM_3$, arrow 75, and minimum when the magnetization of $FM_2$ is aligned parallel with the magnetization of pinned layer $FM_1$, arrow 71. Additionally, since the magnetizations of the two pinned layers, $FM_1$ and $FM_2$, are aligned in opposite directions, each layer acts as a magnetic flux-keeper for the other layer, thus reducing the demagnetizing effect of the pinned layers.

Referring now also to FIG. 9, another preferred embodiment of an MR sensor 40 according to the principles of the present invention comprises a first thin film layer 51 of antiferromagnetic material, a first thin film layer 41 of ferromagnetic material, a first thin film layer 43 of a non-magnetic metallic material, a second thin film layer 45 of ferromagnetic material, a second thin film layer 47 of a non-magnetic metallic material, a third thin film layer 49 of ferromagnetic material and a second thin film layer 53 of antiferromagnetic material. The two antiferromagnetic layers 51 and 53 provide a bias field in the adjacent ferromagnetic layers 41 and 49, respectively, by exchange coupling, as is known in the art. The magnetizations, as indicated by arrows 42 and 48, respectively, of the two outer ferromagnetic layers 41 and 49 are oriented antiparallel to each other, i.e., in opposite directions, and at an angle of about 90 degrees with respect to the magnetization, as indicated by arrow 44, of the intermediate layer 45 of ferromagnetic material in the absence of an externally applied magnetic field. In addition, the magnetization direction of the first and third outer layers, 41 and 49 of ferromagnetic material are fixed or pinned in the preferred orientation as shown by the arrows 42 and 48 by the exchange bias of the antiferromagnetic layers 51 and 53, respectively.

In this preferred embodiment exchange bias layers 51 and 53 comprise different antiferromagnetic materials, preferably FeMn and nickel-manganese (NiMn), respectively, for example. The two antiferromagnetic materials have different blocking temperatures, thus allowing the exchange bias direction of each antiferromagnetic layer 51, 53 to be set independent of the other. For example, in the case of FeMn and NiMn, the blocking temperature for the FeMn is approximately 220 degrees C while the blocking temperature for NiMn is much higher. Thus, the exchange bias direction for the NiMn layer is first set at a relatively high temperature, about 260 degrees C, for example, then the exchange bias direction for the FeMn layer is set a lower temperature, just slightly above the blocking temperature for FeMn, about 230 degrees C, for example. As discussed above, a seed layer can be used to insure that the antiferromagnetic layers 51, 53 have the desired structure. In order to provide a sensor which produces high values of magnetoresistance, the materials for the ferromagnetic layers 41, 45 and 49 are chosen to utilize both positive and negative GMR layer pairs. As described above with reference to FIG. 7, materials are chosen such that between the first and second ferromagnetic layers 41 and 45 the GMR is positive, and that between the second and third ferromagnetic layers 45 and 49 the GMR is negative. Dilute alloys of vanadium (V) or chromium (Cr) in a Ni or Fe matrix provide ferromagnetic materials wherein $rho_{up} > rho_{down}$, while Fe or Co in a Ni matrix provide ferromagnetic materials wherein $rho_{up} < rho_{down}$, for example. Spin-dependent resistivities for Fe or Co diluted with aluminum (Al), iridium (Ir) or Mn are also known. The non-magnetic spacer layers 43 and 47 can be any suitable non-magnetic metallic material such as Cu, Au or Ag, for example.

Referring now to FIG. 10, a further embodiment of the dual spin valve MR sensor according to the present invention is shown. A suitable underlayer 57, such as Ta, Ru or CrV, for example, is deposited on substrate 55 prior to the deposition of a first antiferromagnetic exchange bias layer 59. The purpose of underlayer 57 is to optimize the texture, grain size and morphology of the subsequent layers. The morphology can be crucial in obtaining the large MR effects characteristic of dual spin valve structures since it permits the use of very thin non-magnetic metallic spacer layers 63 and 65 between the ferromagnetic layers 61, 65 and 69. The underlayer must also have a high resistivity to minimize electrical current shunting effects. Should the substrate 55 be of a material having a sufficiently high resistivity, have a sufficiently planar surface and have a suitable crystallographic structure, the underlayer 57 can be omitted. Any suitable antiferromagnetic magnetic material may be utilized for the exchange bias layer 59 such as FeMn or NiMn, for example. In particular, the use of FeMn(60/40 by atomic weight) results in a reduction of the coupling field between the following two ferromagnetic layers where the FeMn antiferromagnetic layer is deposited first. A seed layer (not shown) may also be required if the material utilized for the first antiferromagnetic layer 59 cannot be directly deposited with the proper crystalline structure. For example, as discussed above, when FeMn is utilized for the exchange bias layer, a seed layer, preferably of NiFe or AuCu, is desirable to ensure that the antiferromagnetic form of FeMn is obtained.

A first thin film layer 61 of ferromagnetic material, a first thin film layer 63 of a non-magnetic metallic material, a second thin film layer 65 of ferromagnetic material, a second thin film layer 67 of a non-magnetic metallic material, a third thin film layer 69 of ferromagnetic material and a second thin film exchange bias layer 71 of antiferromagnetic material are deposited over underlayer 57. The first and third ferromagnetic layers 61 and 69 have their magnetizations oriented parallel to each other and at an angle of approximately 90 degrees with respect to the magnetization of the second, intermediate ferromagnetic layer 65 in the absence of an applied magnetic field. As described above, the magnetization directions of the first and third ferromagnetic layers 61 and 69 are fixed or pinned in position by a biasing field produced by exchange coupling. Alternatively, the outer ferromagnetic layers 61, 69 can be pinned utilizing an adjacent hard magnetic layer or by utilizing materials having relatively high coercivities for the outer ferromagnetic layers and setting the magnetization directions during fabrication. If the magnetization directions of the outer ferromagnetic layers 61, 69 are different, antiparallel, for example, the coercivity for each layer will have to be different to allow the magnetization direction of one layer to be set independent of the other layer.

The ferromagnetic layers 61, 65 and 69 can be fabricated of any suitable magnetic material such as Co, Fe, Ni and their alloys such as NiFe, NiCo and FeCo, for example. The thicknesses of the ferromagnetic layers 61, 65 and 69 can be selected from a range of about 5 Å to about 150 Å.

The non-magnetic spacer layers 63 and 67 are preferably metallic with high conductivity. Noble materials such as Au, Ag and Cu provide large MR response, Pt and Pd provide small MR response, while Cr and Ta exhibit very little MR response. The thickness of the non-magnetic spacer layers 63 and 67 is less than the mean free path of the conduction electrons in the sensor, preferably within the range of about 10 Å to about 40 Å.

A capping layer 73 of a high resistivity material such as Ta or zirconium (Zr), for example, is then deposited over the MR sensor. Electrical leads 76 are provided to form a circuit path between the MR sensor and a current source 77 and a sensing means 79. In addition, in order to minimize Barkhausen noise it is desirable to provide a longitudinal bias field parallel to the longitudinal direction of the magnetic layers in the sensor. As is known in the art, layers 75 of a suitable magnetically hard material are deposited over the end regions of the sensor thus providing a longitudinal bias field in a central active region 78 of the sensor. Alternately, the longitudinal bias field can be provided by exchange coupling with antiferromagnetic layers formed over the sensor end regions in direct contact with the ferromagnetic layers.

While the present invention has been particularly shown and described with reference to preferred embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

We claim:

1. A magnetoresistive sensor comprising:
a substrate; and
a layered structure formed on said substrate comprising, a first, a second and a third layer of ferromagnetic material, each of said layers of ferromagnetic material separated from the adjacent layer of ferromagnetic material by a layer of non-magnetic metallic material, said second layer of ferromagnetic material disposed between said first and third layers of ferromagnetic material, the direction of magnetization being fixed in said first and third layers of ferromagnetic material, the direction of magnetization in said second layer of ferromagnetic material being substantially perpendicular to said fixed directions of magnetization in said first and third layers of ferromagnetic material at zero applied magnetic field.

2. A magnetoresistive sensor as in claim 1 wherein each of said layers of ferromagnetic material further comprise at least one additional layer of material.

3. A magnetoresistive sensor as in claim 2 wherein said additional layer of material comprises at least one nanolayer of ferromagnetic material.

4. A magnetoresistive sensor as in claim 3 wherein each said layer of ferromagnetic material further comprises a nanolayer of a different ferromagnetic material disposed at the interface between said layer of ferromagnetic material and said layer of non-magnetic metallic material.

5. A magnetoresistive sensor as in claim 4 wherein each of said first and third layers of ferromagnetic material form a bilayer comprising a layer of a first ferromagnetic material and a nanolayer of a second ferromagnetic material, said nanolayer disposed at the interface between said first and third layers of ferromagnetic material and said layer of non-magnetic metallic material separating said first and third layers of ferromagnetic material, respectively, from said second layer of ferromagnetic material, and said second layer of ferromagnetic material forming a trilayer comprising a layer of a first ferromagnetic material and two nanolayers of a second ferromagnetic material, said nanolayers disposed at the interfaces between said second layer of ferromagnetic material and said layers of non-magnetic metallic material separating said second layer of ferromagnetic material from said first and third layers of ferromagnetic material, respectively.

6. A magnetoresistive sensor as in claim 3 wherein said nanolayer has a thickness in the range of about 0.5 Angstroms to about 20.0 Angstroms.

7. A magnetoresistive sensor as in claim 1 further comprising means for fixing the direction of magnetization in said first and third layers of ferromagnetic material.

8. A magnetoresistive sensor as in claim 1 further comprising a first layer of magnetically hard material adjacent to said first layer of ferromagnetic material, and a second layer of magnetically hard material adjacent to said third layer of ferromagnetic material, said first and second layers of magnetically hard material for providing a magnetic bias field in said first and third layers of ferromagnetic material, respectively, thereby fixing the direction of magnetization in said layers.

9. A magnetoresistive sensor as in claim 1 further comprising a first layer of antiferromagnetic material adjacent to and in contact with said first layer of ferromagnetic material, and a second layer of antiferromagnetic material adjacent to and in contact with said third layer of ferromagnetic material, said first and second layers of antiferromagnetic material for providing a magnetic bias field in said first and third layers of ferromagnetic material, respectively, thereby fixing the direction of magnetization in said layers.

10. A magnetoresistive sensor as in claim 9 wherein said first and second layers of antiferromagnetic material are comprised of a material selected from the group comprised of iron-manganese, nickel-manganese and iron-nickel-manganese.

11. A magnetoresistive sensor as in claim 10 wherein said first and second layers of antiferromagnetic material comprise iron-manganese.

12. A magnetoresistive sensor as in claim 9 wherein said first and second layers of antiferromagnetic material have a thickness within the range of about 50 Angstroms to about 200 Angstroms.

13. A magnetoresistive sensor as in claim 1 wherein said first, second and third layers of ferromagnetic material are comprised of a material selected from the group consisting of iron, cobalt and nickel and alloys of iron, cobalt or nickel.

14. A magnetoresistive sensor as in claim 13 wherein said first, second and third layers of ferromagnetic material are comprised of an alloy of nickel-iron.

15. A magnetoresistive sensor as in claim 1 wherein said first, second and third layers of ferromagnetic material have a thickness within the range of about 5 Angstroms to about 150 Angstroms.

16. A magnetoresistive sensor as in claim 1 wherein said non-magnetic metallic spacer layer has a thickness less than the mean free path length of conduction electrons in said non-magnetic metallic spacer layer.

17. A magnetoresistive sensor as in claim 16 wherein said non-magnetic metallic spacer layer has a thickness within the range of about 10 Angstroms to about 40 Angstroms.

18. A magnetoresistive sensor as in claim 1 where in said first and second non-magnetic metallic spacer layers are comprised of a material selected from the group consisting of silver, gold, copper and alloys of silver, copper and gold.

19. A magnetoresistive sensor as in claim 18 wherein each said first and second non-magnetic metallic spacer layer comprises a thin film layer of copper.

20. A magnetoresistive sensor as in claim 1 wherein said directions of magnetization in said first and third layers of ferromagnetic material are aligned in a parallel orientation.

21. A magnetoresistive sensor as in claim 1 wherein each said first and third layers of ferromagnetic material comprises a ferromagnetic material having a different coercivity than the coercivity of the ferromagnetic material of the other layer.

22. A magnetic storage system comprising:
a magnetic storage medium having a plurality of tracks for recording of data;
a magnetic transducer maintained in a closely spaced position relative to said magnetic storage medium during relative motion between said magnetic transducer and said magnetic storage medium, said magnetic transducer including a magnetoresistive read sensor comprising:
a layered structure formed on a substrate comprising, a first, a second and a third layer of ferromagnetic material, each of said layers of ferromagnetic material separated from the adjacent layer of ferromagnetic material by a layer of non-magnetic metallic material, said second layer of ferromagnetic material disposed between said first and third layers of ferromagnetic material, the direction of magnetization being fixed in said first and third layers of ferromagnetic material, the direction of magnetization in said second layer of ferromagnetic material being substantially perpendicular to said fixed directions of magnetization in said first and third layers of ferromagnetic material at zero applied magnetic field; and
a first layer of antiferromagnetic material adjacent to and in contact with said first layer of ferromagnetic material, and a second layer of antiferromagnetic material adjacent to and in contact with said third layer of ferromagnetic material, said first and second layers of antiferromagnetic material for providing a magnetic bias field in said first and third layers of ferromagnetic material, respectively, thereby fixing the direction of magnetization in said layers;
actuator means coupled to said magnetic transducer for moving said magnetic transducer to selected tracks on said magnetic storage medium; and
detection means coupled to said magnetoresistive read sensor for detecting resistance changes in said magnetoresistive material responsive to magnetic fields representative of data bits recorded in said magnetic storage medium intercepted by said magnetoresistive sensor.

23. A magnetic storage system as in claim 22 wherein said first and second layers of antiferromagnetic material are comprised of a material selected from the group consisting of iron-manganese and nickel-manganese.

24. A magnetic storage system as in claim 22 wherein said magnetoresistive sensor further comprises:
a capping layer deposited over said second antiferromagnetic layer; and
electrical lead means deposited over said capping layer for coupling said magnetoresistive sensor to said detection means.

25. A magnetic storage system as in claim 24 wherein said capping layer comprises a material selected from the group consisting of tantalum and zirconium.

26. A magnetic storage system as in claim 24 further comprising means for providing a longitudinal bias field in an active portion of said magnetoresistive sensor.

27. A magnetic storage system as in claim 22 wherein said directions of magnetization in said first and third layers of ferromagnetic material are aligned in a parallel orientation.

28. A magnetoresistive sensor comprising a layered structure formed in a substrate including a first, a second and a third layer of ferromagnetic material, each of said layers of ferromagnetic material separated from the adjacent layer of ferromagnetic material by a layer of non-magnetic metallic material, said second layer of ferromagnetic material disposed between said first and third layers of ferromagnetic material, the direction of magnetization being fixed in said first and third layers of ferromagnetic material, the direction of magnetization in said second layer of ferromagnetic material being substantially perpendicular to said fixed directions of magnetization in said first and third layers of ferromagnetic material at zero applied magnetic field, said first and second layers of ferromagnetic material forming a first pair of ferromagnetic layers separated by a non-magnetic layer having a positive giant magnetoresistance therebetween and said second and third layers of ferromagnetic material forming a second pair of ferromagnetic layers separated by a non-magnetic layer having a negative giant magnetoresistance therebetween.

29. A magnetoresistive sensor as in claim 28 wherein said directions of magnetization in said first and third layers of ferromagnetic material are aligned in an anti-parallel orientation.

30. A magnetoresistive sensor as in claim 28 further comprising a layer of a first antiferromagnetic material adjacent to and in contact with said first layer of ferromagnetic material, and a layer of a second antiferromagnetic material adjacent to and in contact with said third layer of ferromagnetic material, said first and second layers of antiferromagnetic material for providing a magnetic bias field in said first and third layers of ferromagnetic material, respectively, thereby fixing the direction of magnetization in said layers.

31. A magnetoresistive sensor as in claim 30 were in said first and second antiferromagnetic materials have different blocking temperatures.

32. A magnetoresistive sensor as in claim 28 further comprising means for fixing the direction of magnetization in said first and third layers of ferromagnetic material.

33. A magnetoresistive sensor as in claim 32 wherein said means comprise a first layer of magnetically hard material adjacent to said first layer of ferromagnetic material, and a second layer of magnetically hard material adjacent to said third layer of ferromagnetic material, said first and second layers of magnetically hard material for providing a magnetic bias field in said first and third layers of ferromagnetic material, respectively, thereby fixing the direction of magnetization in said layers.

34. A magnetoresistive sensor as in claim 28 further comprising a first layer of antiferromagnetic material adjacent to and in contact with said first layer of ferromagnetic material, and a second layer of antiferromagnetic material adjacent to and in contact with said third layer of ferromagnetic material, said first and second layers of antiferromagnetic material for providing a magnetic bias field in said first and third layers of ferromagnetic material, respectively, thereby fixing the direction of magnetization in said layers.

35. A magnetoresistive sensor as in claim 28 wherein said first and third layers of ferromagnetic material comprise a ferromagnetic material having a high coercivity.

36. A magnetoresistive sensor as in claim 35 wherein each said first and third layers of ferromagnetic material comprises a ferromagnetic material having a different coercivity than the coercivity of the ferromagnetic material of the other layer.

* * * * *